United States Patent
Hitzl et al.

(10) Patent No.: US 9,840,677 B2
(45) Date of Patent: Dec. 12, 2017

(54) BIOFUEL PRODUCT AND METHOD FOR THE PRODUCTION THEREOF

(71) Applicant: INGELIA, S.L., Valencia (ES)

(72) Inventors: Martin Hitzl, Valencia (ES); Michael Renz, Valencia (ES); Avelino Corma Canos, Valencia (ES)

(73) Assignee: INGELIA, S.L., Valencia (ES)

( * ) Notice: Subject to any disclaimer, the term of this patent is extended or adjusted under 35 U.S.C. 154(b) by 323 days.

(21) Appl. No.: 14/427,389

(22) PCT Filed: Sep. 17, 2013

(86) PCT No.: PCT/ES2013/070645
§ 371 (c)(1),
(2) Date: Mar. 11, 2015

(87) PCT Pub. No.: WO2014/044888
PCT Pub. Date: Mar. 27, 2014

(65) Prior Publication Data
US 2015/0240175 A1 Aug. 27, 2015

(30) Foreign Application Priority Data
Sep. 19, 2012 (ES) .................. 201231451

(51) Int. Cl.
*C10L 1/32* (2006.01)
*C10L 5/44* (2006.01)
(Continued)

(52) U.S. Cl.
CPC ............... *C10L 1/326* (2013.01); *C10L 5/447* (2013.01); *C10L 9/086* (2013.01); *C10L 10/02* (2013.01);
(Continued)

(58) Field of Classification Search
CPC .......... C10L 1/326; C10L 5/447; C10L 9/086; C10L 10/02; C10L 2200/0469;
(Continued)

(56) References Cited

U.S. PATENT DOCUMENTS

| | | |
|---|---|---|
| 3,073,652 A | 1/1963 | Reichl |
| 4,282,006 A | 8/1981 | Funk |

(Continued)

FOREIGN PATENT DOCUMENTS

| | | |
|---|---|---|
| EP | 2 366 757 | 9/2011 |
| GB | 2 181 166 | 4/1987 |

OTHER PUBLICATIONS

International Search Report dated Dec. 5, 2013 in International (PCT) Application No. PCT/ES2013/070645.

*Primary Examiner* — Phutthiwat Wongwian
*Assistant Examiner* — Loren Edwards
(74) *Attorney, Agent, or Firm* — Wenderoth, Lind & Ponack, L.L.P.

(57) ABSTRACT

The invention relates to a method for producing a biofuel from an aqueous mixture of carbonized biomass obtained by means of a method for the hydrothermal carbonization of biomass, characterized in that it comprises: (a) grinding the aqueous mixture of carbonized biomass until a maximum size of less than 500 micrometers of the particles contained in the mixture is obtained; (b) applying a method for the physical separation of inorganic substances; and (c) reducing the moisture content until a water content of between 25 and 55 wt. % is reached. The invention also relates to the biofuel obtained by said method, and to the use thereof in various applications.

5 Claims, 1 Drawing Sheet

(51) Int. Cl.
*C10L 9/08* (2006.01)
*C10L 10/02* (2006.01)
*F02C 3/24* (2006.01)
*F02M 25/00* (2006.01)

(52) U.S. Cl.
CPC .............. *F02C 3/24* (2013.01); *F02M 25/00* (2013.01); *C10L 2200/0469* (2013.01); *C10L 2250/06* (2013.01); *C10L 2270/026* (2013.01); *C10L 2270/04* (2013.01); *C10L 2290/08* (2013.01); *C10L 2290/24* (2013.01); *C10L 2290/28* (2013.01); *Y02E 50/10* (2013.01); *Y02E 50/30* (2013.01)

(58) Field of Classification Search
CPC ........... C10L 2250/06; C10L 2270/026; C10L 2270/04; C10L 2290/08; C10L 2290/24; C10L 2290/28; F02C 3/24; F02M 25/00; Y02E 50/10; Y02E 50/30
USPC ...................................... 60/39.461
See application file for complete search history.

(56) References Cited

U.S. PATENT DOCUMENTS

| | | | |
|---|---|---|---|
| 4,465,495 A | 8/1984 | Scheffee | |
| 8,603,204 B2 * | 12/2013 | Ruger | C10B 53/02 423/644 |
| 9,512,376 B2 * | 12/2016 | Peus | C10L 5/44 |
| 2008/0016752 A1 | 1/2008 | Norbeck et al. | |
| 2009/0094892 A1 | 4/2009 | Norbeck et al. | |

* cited by examiner

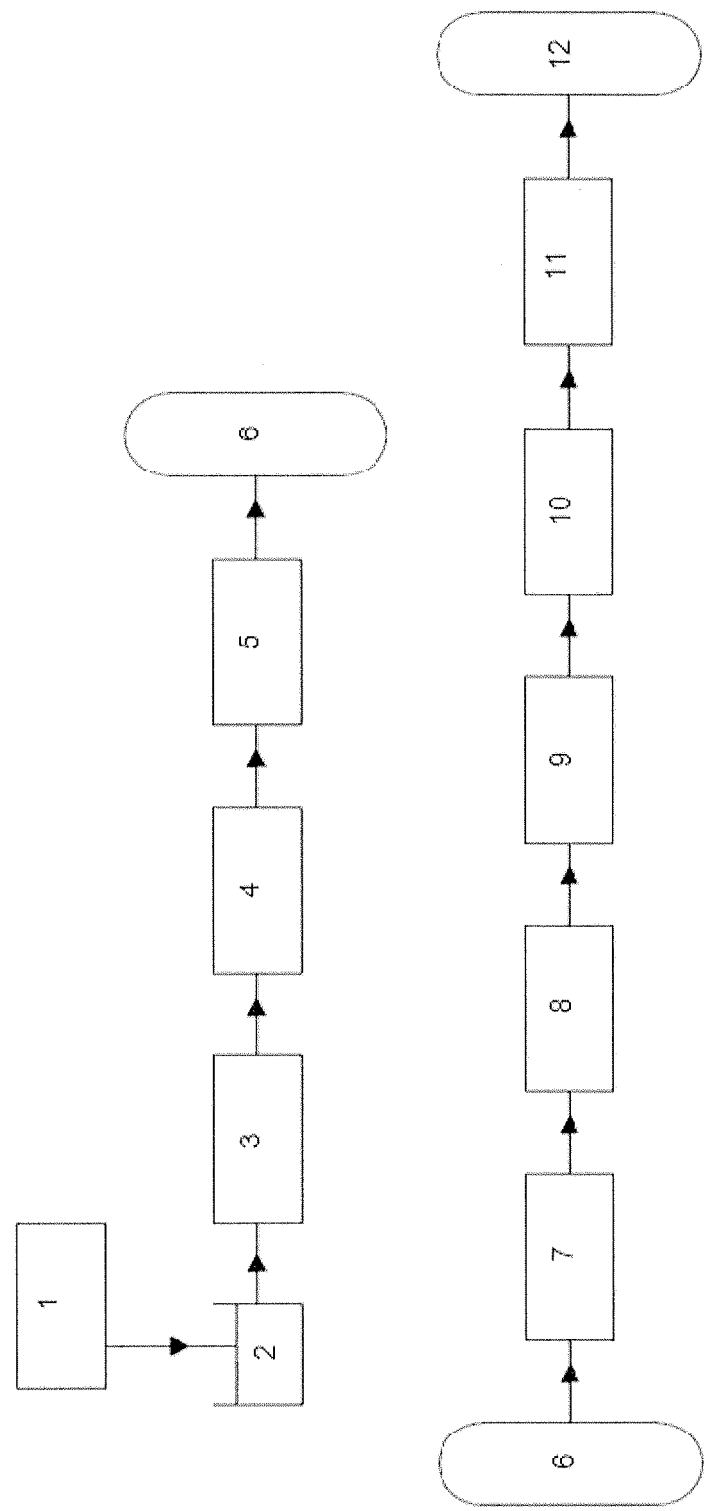

BIOFUEL PRODUCT AND METHOD FOR THE PRODUCTION THEREOF

TECHNICAL FIELD

The present invention belongs to the field of the chemicals industry and more specifically to the field of the treatment of biomass by hydrothermal carbonisation.

PRIOR ART

The process of hydrothermal carbonisation (HTC) has been known since Friedrich Bergius described it in 1913; however, industrial plants have only been developed in recent years. Ingelia S.L. is one of the first companies that has developed an industrial process of continuous hydrothermal carbonisation such as are described in the Spanish patents, ES2339320 and ES2339321 and has operated a plant since August 2010. The objective of the process is to enhance biomass with a high moisture content, such as for example garden prunings, leftovers from forestry and agricultural developments, orange peels, olive stones and other leftover fruits and vegetables, etc., by means of applying pressure and temperature in aqueous conditions, obtaining a product in water called biocarbon.

Initially, the manufacture of compressed and dried carbon pellets was developed for application thereof in thermal and/or thermoelectric stations from the aqueous mixture of biocarbon obtained in the HTC process. However, this application required thermal drying of the biocarbon in order to obtain moisture levels lower than 10%, in addition to having the logistical drawbacks of solid fuels, such as the charge and discharge as well as the potential for spontaneous combustion in oxidising atmosphere.

In this regard, the object of the invention is to define a new process of post-treatment for HTC carbon, with the object of reducing the production and transport costs as well as maximizing its use in the form of Biocoal Water Fuel (hereinafter BWF).

In the literature, there exist studies relating to fuel based on a mixture of mineral and water carbon (known as coal water fuel, CWF). Thus for example, Wibberley et al. ("Efficient use of Coal Water Fuels", Technology Assessment Report 74, CSIRO Energy Technology, 2008) described the use of CWF for generating energy, concentrating on the possibilities to reduce the efficiency losses in the different steps of the process.

Other studies referring to CWF have been described by Wilson, R. et al. ("Coal-fuelled diesels for modular power generation", presented in the Joint Power Generation conference, Kansas City, Mo., 17-21 Oct. 1993, U.S. Pat. No. 4,465,495 ("Process for Making Coal Water Fuel Slurries and Product thereof"), U.S. Pat. No. 3,941,552 ("Burning Water-in-oil Emulsion containing Pulverized Coal") or U.S. Pat. No. 4,335,684 ("Micronized Coal Water Fuel Slurry for Reciprocating Internal Combustion Engines").

Although different research studies have been carried out regarding this type of fuel over many decades (even at the beginning of the $20^{th}$ century), bringing CWF onto the market failed mainly due to the low cost of petrol during the second half of the $20^{th}$ century and the need to use dispersants owing to the opposing nature of carbon, which is apolar, and water, which is polar. However, given the increase in the cost of petrol in recent years, it has been considered necessary to search for efficient economic alternatives to this type of fuel. Furthermore, biocarbon has a considerable oxygen content, which provides this material with greater polar properties and a certain affinity to water. The present invention thus aims to provide a new biofuel obtained from the product of the HTC process.

DESCRIPTION OF THE INVENTION

As a closer prior art to the present invention, patent ES2339320 must be mentioned, the content of which is incorporated into the present application as reference. In this patent, the hydrothermal carbonisation process is described from an aqueous mixture of biomass, which is carried out over a period of between 2 to 12 hours at a temperature of between 180 and 225° C. and at a pressure of between 10 and 25 bar. As a result of the process, an aqueous mixture of carbonised biomass is obtained with porous particles of different sizes, which is collected from the lower part of the inverted flow vertical reactor in which the hydrothermal carbonisation process takes place. The water content may in particular vary between 80 and 90%.

Although it is possible to achieve the separation of water up to a content of approximately 50% using mechanical means and standard economic processes, in order to reduce the moisture content below 50%, thermal process with elevated cost and/or self-consumption of fuel are required.

With the object of solving this difficulty, the present invention is based on the use of an "energy carrier" which allows a high level of moisture, which is an advantage for the HTC process. This is what happens in the case of the so-called coal water fuel (CWF). Said fuel consists of a mixture of 45 to 75% wt. % of mineral carbon milled into fine particles (less than 500 microns) and of 25% to 55% of water with at least one chemical dispersant, preferably selected from polystyrene, polyolefins and polymethacrylate, said chemical dispersants being used in very small quantities, preferably less than 3 wt. % and more preferably less than 1 wt. %. The big disadvantage of CWF is the nature of the mineral carbon used for its manufacture. Its properties require the addition of a dispersion agent which is a product made by the chemical industry with a certain significant value in the calculation of the price of fuel.

The object of this invention is thus a biofuel (BWF) which is characterised by taking advantage of the characteristics of the carbonised biomass obtained in the HTC process as a mixture with water, with optimised properties with respect to CWF, when having a polarity different to the surfaces. This new biofuel (BWF) is characterised by having the values which are shown in Table 1, where the values indicated with (daf) refer to dry base and without ashes:

TABLE 1

| Characteristics of the biofuel (BWF) | |
|---|---|
| PCS, (daf) | >24 MJ/kg |
| PCS with 30% moisture | 17 MJ/kg |
| Carbon (C) (daf, according to CEN/TS 15104) | >60% (daf) |
| Hydrogen (H) (daf, according to CEN/TS 15104) | 5.5-6.5% (daf) |
| Nitrogen (N) (daf, according to CEN/TS 15104) | 0.5-2.5% (daf) |
| Sulphur (S) (daf, according to CEN/TS 15289) | <0.3% (daf) |
| Chlorine (Cl) (daf according to CEN/TS 15289) | <0.3% (daf) |
| Ash melting point (according to CEN/TS 15289) | >1250° C. |
| Ash content, dry base (EN 14775) | <8%, preferably <2% |
| Particle size (according to EN149) | <500 microns, preferably <20 micrometers |

TABLE 1-continued

Characteristics of the biofuel (BWF)

| | |
|---|---|
| Volatile substances (daf, according to EN 15148) | 50-70% (daf) |
| Water content (according to EN 14774) | 25-55% |

A process for obtaining the BWF biofuel previously described is also an object of the invention. This process consists of a post-treatment of the aqueous mixture of carbonised biomass obtained from the HTC process and it is characterised in that it comprises:
(a) grinding the aqueous mixture of carbonised biomass until a maximum size of less than 500 micrometers of the particles contained in the mixture is obtained and preferably less than 20 micrometers. This grinding is preferably carried out in ball mills, water jet mills, centrifugal mills, colloid mills or screen mills, amongst others;
(b) applying a method for the physical separation of inorganic substances (minerals, glasses or metals), preferably by means of gravimetric separation, flotation or other means. Preferably, this process is carried out in a manner suitable for achieving an ash content in the biofuel of less than 8 wt. %;
(c) reducing the moisture content until a water content of between 25 and 55 wt. % is reached. This step of densification/dehydration may be carried out by way of a method from those commonly used in the art (preferably selected from filtration, centrifugation, pressing, etc.).

In Table 2 the characteristics of the aqueous mixture of carbonised biomass obtained from the HTC process are shown, from which the biofuel BWF, which is the object of the invention, is obtained.

TABLE 2

Characteristics of the aqueous mixture of carbonised biomass at the end of the HTC process

| | |
|---|---|
| PCS, (daf) | >24 MJ/kg |
| PCS with 80% moisture | 4-5 MJ/kg |
| Carbon (C) (daf, according to CEN/TS 15104) | >60% (daf) |
| Hydrogen (H) (daf, according to CEN/TS 15104) | 5.5-6.5% (daf) |
| Nitrogen (N) (daf, according to CEN/TS 15104) | 0.5-2.5% (daf) |
| Sulphur (S) (daf, according to CEN/TS 15289) | <0.3% (daf) |
| Chlorine (Cl) (daf according to CEN/TS 15289) | <0.3% (daf) |
| Ash melting point (according to CEN/TS 15289) | >1200° C. |
| Ash content, dry base (EN 14775) | 4-25% |
| Particle size (according to EN149) | <5 cm |
| Volatile substances (daf, according to EN 15148) | 50-70% (daf) |
| Water content (according to EN 14774) | 70-90% |

In a particular embodiment of the invention, the process may comprise a pre-treatment prior to the aqueous mixture of the carbonised biomass obtained in the HTC process. This pre-treatment may comprise:
(a) a first grinding of the aqueous mixture of carbonised biomass until mean sizes of less than 5 mm of particles, preferably less than 0.5 mm, are obtained;
(b) a first separation for inorganic substances which preferably may be carried out by means of separation using cyclones, gravimetric systems, flotation, etc.,
(c) a first dehydration step, preferably by means of filtration, pressing or centrifugation, until a cake is obtained with a water content of approximately 50 wt. %, which is easily storable and transportable as a solid.

Additionally in one particular embodiment, in which a BWF with a high level of purity is required, the process may comprise an additional step of chemical cleaning for dissolving and removing inorganic elements. This step may preferably be carried out following the step of separating the inorganic substances and prior to the dehydration step. In one preferred embodiment, the chemical cleaning may be carried out by means of the addition of at least one base (preferably selected from among alkaline hydroxides or alkaline earth hydroxides) and/or the addition of at least one acid (for example, mineral acids such as sulphuric acid, hydrochloric acid, phosphoric acid, etc.) to reduce the mineral and halogen content fixed in the biocoal with the aim of reducing the percentage of ash and/or inorganic components.

The ash content in the final product may be adjusted to the requirements of the use of the fuel. An ash content of less than 8 wt. % can usually be guaranteed using relatively simple methods and for specific uses, such as for example in combustion engines, levels can even be less than 2 wt. %.

In a preferred embodiment of the invention, the process may comprise a final step of mixing and metering in at least one chemical dispersant, preferably selected from among polystyrene, polyolefins and polymethacrylate. This addition is preferably carried out following the dehydration step. The percentage of dispersants added to the mixture is preferably less than 3 wt. % and more preferably less than 1 wt. %.

In addition to the chemical dispersant, water may be added until reaching the degree of dilution desired in the final product (BWF).

Lastly, in an additional particular embodiment of the invention, the process may comprise adding, preferably after a dehydration step, an additional percentage (between 5 and 50% of the final mass, preferably between 10 and 20% of the final mass) of water or adding at least one liquid fuel such as for example, ethanol, with the aim of improving the pumping characteristics of the mixture and/or the combustion. In this way, the biofuel obtained from the process described may achieve up to 90 wt. % of water.

It is an additional object of the invention to use the biofuel in an application preferably selected from among:
(a) combustion by means of an atomising/spray burner in conventional boilers for thermal or thermoelectric applications;
(b) fuel for diesel cycle internal combustion engines, injecting BWF only or as a mixture with another fuel;
(c) using BWF with a low ash content, the fuel can even be used for gas turbines;
(d) fuel for chemical combustion in combustion cells;
(e) generation of syngas from BWF, etc.

Among the main advantages of BWF, which is the object of the invention, the following may be pointed out:
(a) its possibility to be transported and stored as a liquid;
(b) the low risk of the fuel since it is not auto-flammable;
(c) the low potential of contamination in the case of discharge, since the HTC carbon may be diluted with water;
(d) the fuel may be metered, injected or atomised easily compared to solid fuels. A more complete combustion can thus be obtained with the consequent reduction of unburned fuel and the reduction of particle emissions;
(e) the viscosity of the fuel may be regulated by means of dilution with water;

(f) the water content reduces the combustion temperature and consequently the emission of NOx;

(g) in case of combustion in volumetric engines, advantage is also taken of the volumetric increase of the water evaporation.

BRIEF DESCRIPTION OF THE FIGURES

FIG. 1 represents the diagram of a preferred embodiment of the production process of the BWF.

DESCRIPTION OF A PREFERRED EMBODIMENT OF THE INVENTION

A specific and preferred embodiment of the present invention is detailed below in an illustrative and non-limiting manner.

As shown in FIG. 1, the process starts with a pre-treatment of the aqueous mixture of carbonised biomass (2) obtained at the end of the HTC process (1). This pre-treatment comprises a first grinding (3) of the aqueous mixture of carbonised biomass until mean sizes of particles of less than 5 mm are obtained. Following the first grinding (3), a first separation of inorganic substances (4) is carried out for example by means of cleaning in a flotation column, in which separation by the different densities is carried out. Additionally, a step of dehydration (5) is carried out by means of pressing, until a cake (6) is obtained, with a water content of approximately 50 wt. %, said cake being easily storable.

The cake obtained is then subjected to a fine grinding process (7) by colloidal milling until a mean particles size of less than 20 microns is obtained. Subsequently, the mixture obtained is subjected to a step of separating the inorganic substances (8) by flotation. With the aim of dissolving and removing the inorganic elements not separated in the previous step, the mixture is subjected to a subsequent step of chemical cleaning (9) with at least one base (preferably alkaline hydroxides or alkaline earth hydroxides) and/or the addition of at least one acid (for example, a mineral acid such as sulphuric acid, hydrochloric acid, phosphoric acid, etc.) to dissolve and remove inorganic elements.

Following the chemical cleaning, the process comprises a step of dehydration (10) until the water content is reduced to a percentage less than 50 wt. %. The characteristics of the final product are those shown in the following table:

| | |
|---|---|
| PCS, (daf) | >24 MJ/kg |
| PCS with 30% moisture | 17 MJ/kg |
| Carbon (C) (daf, according to CEN/TS 15104) | >60% (daf) |
| Hydrogen (H) (daf, according to CEN/TS 15104) | 5.5-6.5% (daf) |
| Nitrogen (N) (daf, according to CEN/TS 15104) | 0.5-2.5% (daf) |
| Sulphur (S) (daf, according to CEN/TS 15289) | <0.3% (daf) |
| Chlorine (Cl) (daf according to CEN/TS 15289) | <0.3% (daf) |
| Ash melting point (according to CEN/TS 15289) | >1250° C. |
| Ash content, dry base (EN 14775) | <8%, preferably <2% |
| Particle size (according to EN149) | <500 microns, preferably <20 micrometers |
| Volatile substances (daf, according to EN 15148) | 50-70% (daf) |
| Water content (according to EN 14774) | 25-55% |

Example 1

Different samples of BWF were prepared from coal coming from the HTC process in the Ingelia prototype reactor, as described in ES2339320. The coal was milled and the water content was adjusted to 55 wt. % for its use in the pumping tests.

| Sample | Processed biomass | $C^a$ (wt. %) | $H^a$ (wt. %) | $N^a$ (wt. %) | $S^a$ (wt. %) | Mean particle size (μm) |
|---|---|---|---|---|---|---|
| A | Orange peel | 57 | 6.1 | 1.6 | 0.1 | 40 |
| B | Pruning | 60 | 6.0 | 2.1 | 0.1 | <10 |
| C | Pruning/grass | 61 | 6.1 | 1.9 | 0.2 | b |

$^a$based on dry coal without ashes;
b not determined.

Example 2. Pumping Tests

The samples A-C prepared and characterised in example 1 were subjected to a pumping test. To this end, the mixture was introduced into a tube with a diameter of less than 2.8 cm and extruded through a hole of 2.1 mm. A positive result was reported when 90% or more of the mixture was able to be extruded. It was also visually observed whether a separation of the coal and the water took place after or during the extrusion.

| Sample | Extrusion >90% | Water separation |
|---|---|---|
| A | Yes$^a$ | No |
| B | Yes | No |
| C | Yes | No |

$^a$65 wt. % water content.

In all cases, the water carbon mixture could be extruded without the addition of dispersant agents due to the hydrophilic surface. The mixtures behave like Bingham fluids and are stables as such. In order to study the pumping behaviour of the mixture with different concentrations, on one occasion an additional 10% (wt. of the final mass) of water was added and in another case an additional 10% (wt. of the final mass) of ethanol was added. The result obtained was an improvement in the fluidity of the mixture, without producing separation of the coal-liquid mixture. In the case of adding liquid organic compounds, such as for example ethanol, the pumping characteristics are improved at ambient temperatures below 0° C., thus reducing the freezing point of the mixture.

The invention claimed is:

1. A process for obtaining a biofuel from an aqueous mixture of carbonised biomass obtained in a process for hydrothermal carbonisation of the biomass, comprising the steps of:
   (a) grinding the aqueous mixture of carbonised biomass, wherein the mixture has a carbon content of at least 60% and a content of volatile substances of between 50 and 70%, expressed on a dry ash-free basis, until a maximum particle size of less than 500 micrometers is obtained;
   (b) applying a process for physical separation of inorganic substances; and
   (c) reducing a moisture content until a water content of between 25 and 55 wt. % is reached.

2. The process according to claim 1, further comprising applying a pre-treatment to the aqueous mixture of carbonised biomass, wherein said pre-treatment comprises:
(1) a first grinding step of the aqueous mixture of carbonised biomass until a mean particle size of less than 5 mm is obtained;
(2) a first separation step of inorganic substances; and
(3) a first dehydration step until a water content of less than 50 wt. %. is obtained.

3. The process according to claim 1, further comprising an additional step of mixing and metering in less than 3 wt. % of at least one chemical dispersant.

4. The process according to claim 1, further comprising a step (d) subsequent to step (c) for a further physical separation of inorganic substances, wherein said step (d) consists of a chemical separation process of adding at least one base and/or at least one acid.

5. The process according to claim 1, further comprising adding water or at least one liquid fuel.

* * * * *